Aug. 6, 1963     A. HERCZOG ET AL     3,100,250
ZONE MELTING APPARATUS

Filed April 7, 1961     2 Sheets-Sheet 1

INVENTORS
ANDREW HERCZOG
AND ROLF R. HABERECHT
BY
ATTORNEYS

Aug. 6, 1963 A. HERCZOG ET AL 3,100,250
ZONE MELTING APPARATUS
Filed April 7, 1961 2 Sheets-Sheet 2

INVENTORS
ANDREW HERCZOG
AND ROLF R. HABERECHT
BY
ATTORNEYS

United States Patent Office 3,100,250
Patented Aug. 6, 1963

3,100,250
ZONE MELTING APPARATUS
Andrew Herczog, Painted Post, N.Y., and Rolf R. Haberecht, Indianapolis, Ind., assignors to the United States of America as represented by the Secretary of the Air Force
Filed Apr. 7, 1961, Ser. No. 101,605
2 Claims. (Cl. 219—10.49)

This invention relates generally to zone melting and more particularly to an improved method and apparatus for producing a small molten zone in a container by induction heating.

Zone melting apparatus is utilized to purify metals having high thermal conductivity and low electrical resistivity and for the purification and crystallization of other metals or semi-conductors.

It is desirable in a zone refining process to keep the width of the molten zone as small as possible since the degree of purification increases exponentially with the inverse of the liquid zone width of the material being refined. Reduction of the zone width also allows for an increased yield of high purity material by reducing the length of the impure end of a zone refined ingot.

Prior art zone melting techniques with metals of high thermal conductivity and low electrical resistivity are incapable of producing a small zone width without serious operational difficulties.

Accordingly, it is an object of this invention to provide a novel method and apparatus for zone melting wherein the width of the molten zone is of a smaller size than that heretofore obtained.

It is another object of this invention to provide a zone melting method and apparatus which allows for an increase in the yield of high purity material.

It is still another object of this invention to provide an induction heating technique to zone melting apparatus wherein the zone width is minimal.

It is a further object of this invention to provide an induction heating technique to zone melting apparatus whereby spilling out of the molten material from an open boat or container is eliminated.

Another object of this invention involves the provision of a zone melting technique utilizing induction heating without the use of closed containers with their attendant disadvantages.

Still another object of this invention involves the use of induction heating in a zone melting apparatus wherein a stirring action in the liquid zone is achieved thereby increasing the impurity segregation in the zone melting process and therefore, the efficiency of the process.

A further object of this invention involves the provision of an induction heating technique in zone melting apparatus wherein the power induced in the metal to be melted is utilized almost exclusively for creating the molten zone.

A still further object of this invention involves the provision for induction heating in zone refining apparatus wherein the ratio of power dissipation between the container and metal within the container and the wall thickness of the container are chosen to provide optimum results from the zone refining process.

Another object of this invention involves the use of a zone refining technique wherein the formation of dendrites is minimized.

These and other advantages, features and objects of the invention will become more apparent from the following description taken in connection with the illustrative embodiments in the accompanying drawings, wherein.

Figure 1:
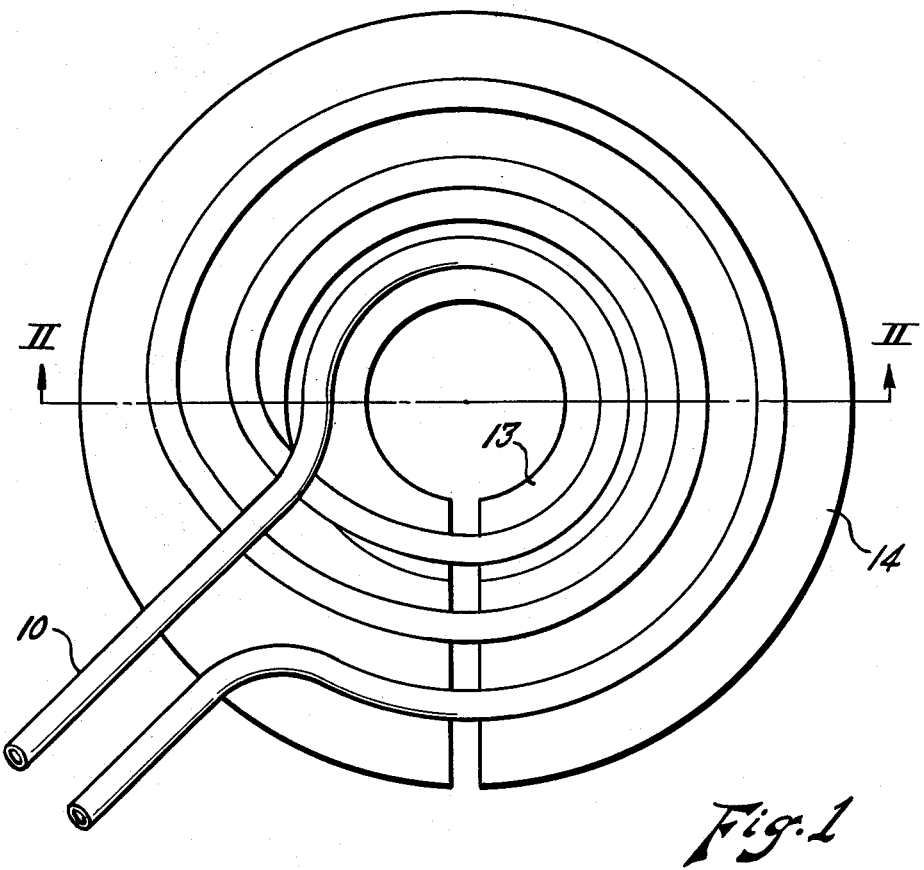
FIGURE 1 is a plan view of the load coil of an R.F. induction heating unit for use with zone refining apparatus.

Zone refining is a relatively new technique for obtaining the ultra-pure materials needed for the electronics industry and is described in the patent to W. G. Pfann, 2,739,088 of March 20, 1956.

In zone melting, the molten zone can be produced either by heat applied from an outside source by resistance heaters or by induction heating. If resistance heat is applied by contact or by radiation from the heater to the boat containing the metal, the conditions vary according to the thermal conductivity and radiation absorption of the boat and of the metal. In case of some metals such as are listed in the first part of Table 1, reproduced infra, the thermal conductivity of the metal is much higher than the conductivity of the boat. As a consequence, the heat transfer inside the metal is more rapid than the heat transfer from the heat source to the metal through the boat. This will cause a considerable spreading of the molten zone, especially in the case where the heat is applied on a larger portion of the boat surface. In the case when a high temperature heat source is applied to a small portion of the boat, the temperature of the heated portion of the boat will be very high. Overheating increases contamination of the metal by the boat material or its impurities and in many cases the operation becomes extremely difficult or impossible by the excess heat and temperature.

The method and apparatus of this invention involves the utilization of induction heating techniques; however, before considering the techniques, a few of the principles of induction heating which are utilized in the concept of this invention follow.

For a cylindrical charge of uniform cross-section in a helicoidal coil, the power P dissipated per cm.² of surface area in the charge is given approximately by:

$$P = \frac{H^2\sqrt{\mu \cdot f \cdot \rho \cdot 10^9}}{8\pi} \cdot 10^{-7} \qquad (1)$$

where $H = 4\pi NI$ is the magnet field strength or ampere turns, $\mu$ the relative permeability is close to 1 for non-ferrous metals, $f$ is the frequency in cycles per second and $\rho$ the resistivity in ohm cm.

The optimum frequency, $f_0$, for heating can be derived from Equation 1:

$$f_0 = \frac{6.25 \cdot \rho \cdot 10^9}{8\pi^2 \cdot \mu \cdot r_0^2} \qquad (2)$$

where $r_0$ = radius of the work piece and $f_0$ defined as a minimum frequency above which no further gain in power transfer may be realized.

Table 1 reproduced infra shows data of resistivity, $\rho$, in ohm-cm. and of thermal conductivity $C'$ in cal./sec. cm.², ° C./cm. in increasing order the ratio $\rho/C'$. Furthermore, similar data are given for some other metals, semi-conductors and some common heat materials.

Table 1

| Material | $\rho.10^6$ | $C'$ | $\rho.10^6/C'$ |
|---|---|---|---|
| Silver, at 20° C | 1.59 | 1.0 | 1.6 |
| Silver liquid at M.P | 17.0 | ~0.5 | |
| Copper, at 20° C | 1.69 | 0.94 | 1.8 |
| Copper liquid at M.P | 24.6 | ~0.55 | |
| Gold, at 20° C | 2.19 | 0.71 | 3.1 |
| Gold liquid at M.P | 31.3 | | |
| Aluminum, at 20° C | 2.63 | 0.53 | 5.0 |
| Aluminum liquid at M.P | 20.5 | 0.25 | |
| Calcium, at 20° C | 3.43 | 0.30 | 11.4 |
| Magnesium, at 20° C | 4.46 | 0.38 | 11.7 |
| Sodium, at 20° C | 4.20 | 0.32 | 13.1 |
| Sodium liquid at M.P | 9.65 | 0.21 | |
| Steel (carbon) at 20° C | 14.0 | 0.13 | 108 |
| Steel (carbon) at 1,200° C | 122 | 0.07 | |
| Germanium, silicon at 20° C | ~$10^5$–$10^6$ | 0.15–0.20 | $10^6$–$10^8$ |
| Germanium, silicon at M.P | $10^3$–$10^4$ | | |
| Graphite, at 20° C | 800 | 0.24 | 3,330 |
| Graphite, at 1,200° C | 900 | | |
| Alumina, dense, at 20° C | V. high | 0.02 | |
| Alumina, dense, at 1,200° C | V. high | 0.005 | |
| Silica, fused, at 20° C | V. high | 0.003 | |

Applying Equation 1 for the case of metals of low electrical resistivity, requires a very high field intensity for dissipating a given amount of power at a given frequency. Because these metals have also a high thermal conductivity, this power must also be dissipated in a very small section of the ingot in order to prevent the spreading of the molten zone. Therefore, helicoidal work coils with a large number of turns can not be used for producing the necessary field. Flat spiral shaped work coils are better and other current transformer type of coils such as shown in FIGURES 1 and 2 are the most convenient.

Figure 2:
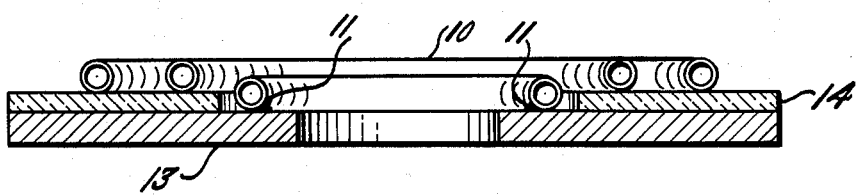
FIGURE 2 is a section of FIGURE 1 taken along lines II—II.

FIGURES 1 and 2 represent the work coil of an induction heating unit which is capable of generating a concentrated field and through which a container or boat is reciprocated. The induction unit comprises a copper tube 10 oriented in a spiral, as shown, and is secured at the innermost turns at 11, for example, by soldering to a copper plate 13 having a hole therethrough. A Teflon or glass insulator 14 is secured by any conventional means to the copper plate and supports the outermost coils. Although a particular construction of the heating unit has been presented, the concept of the invention allows for the utilization of different structural arrangements which produce the same results as the illustrated embodiment.

This is a feasible and known approach which presents however, some disadvantages. The high current density concentrated in a small portion of the ingot produces mechanical forces acting on the molten metal. These forces tend to drift the molten metal out of the center or out of the container and cause undesired effects such as varying cross-section of the ingot and spilling out of the liquid metal from the boat. Under these conditions, the zone melting becomes impossible after a few passes of the molten zone through the ingot. This situation can be improved using a closed tube as a container for the molten metal instead of a boat. In such case, however, visual observation is impossible and, in many cases, the tube can easily be cracked. Furthermore, the discharge of the refined material from the tube presents considerable difficulties.

A further difficulty in applying known methods of induction heating for low resistivity metals is presented at the beginning of the refining operation when the metal must be heated from room temperature up to the melting point of the metal. This difficulty arises from the large difference in resistivity between room temperature and the melting point, as shown for several cases in Table 1. A coil which will operate at the melting point is inoperative at room temperature. For this reason, either the coil and heating unit must be considerably overdimensioned to satisfy the initial heating requirements or an additional heat source must be applied for heating the metal up to the melting point.

The foregoing discussion on zone melting by induction heat disregarded any effect due to the boat or container surrounding the metal. The discussion is only correct for the ideal case of a boat material which is a perfect insulator of heat and which does not couple with the high frequency field. This ideal case is approached by refractory oxides such as silica or alumina, as shown by data of Table 1. The most important boat material for high purity metals, graphite, shows a different behaviour. From Equations 1 and 2, and from data of Table 1, results that graphite couples much more efficiently with a high frequency field than low resistivity metals. Under such circumstances the induction heat is dissipated almost entirely in the graphite while the metal is heated by conduction from the boat. This method could be called, therefore, indirect induction heating in opposition to direct induction heating where heat is generated in the metal directly by the high frequency field. The metal being a good thermal conductor, the balance between heat transfer from the metal to the boat, supplying the useful heat for melting, and heat conduction inside the metal and the boat, causing the spreading of the zone, is unfavorable. No narrow molten zone can be obtained under this condition for high thermal conductivity metals. A further disadvantage is given in this case, as well as in the case of resistance heating, by the lack of stirring action by induced currents. Stirring in the liquid zone is known to promote impurity segregation and increases the efficiency of the process.

Figure 3:
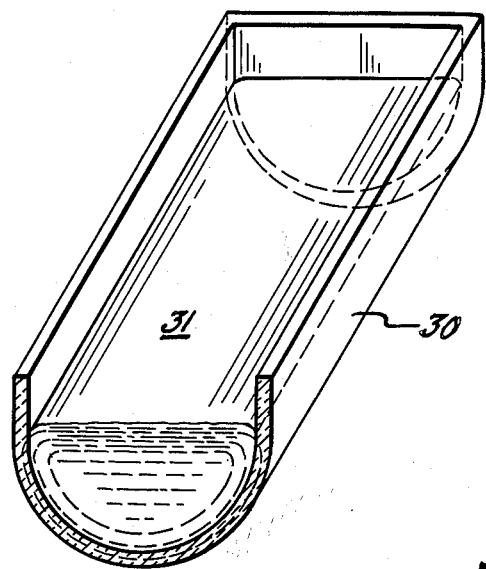
FIGURE 3 is a view in perspective, having a portion broken away, of a container with material to be purified showing the liquid metal at the broken portion and having the induction currents illustrated in dotted lines.
Figure 3:
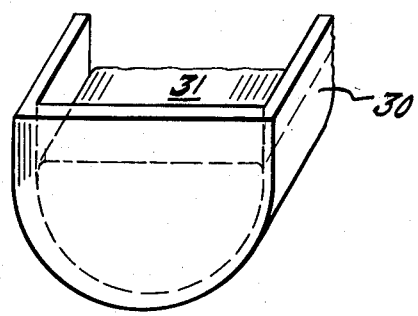

The method and apparatus of this invention involves the utilization of a combination of direct and indirect induction heating. Referring to FIGURE 3, a boat or container 30 contains a material 31 to be zone refined. The boat or container 30 is made from a material exhibiting a good coupling with an R.F. field.

The wall thickness of the boat or container is less or equal to the skin depth of the induced current for a given frequency and given resistivity of the boat material. The skin depth can be calculated by the formula:

$$D \cong 5\sqrt{\frac{\rho.10^6}{\mu f}} \text{ cm.} \qquad (3)$$

For example for graphite at 450 kilocycles, the skin depth is about 0.2 cm. and increases with decrease of frequency. If the walls of the boat are thinner than the skin depth, a part of the power will be dissipated in the boat and the rest of the power in the metal directly. This system presents several advantages:

The power dissipated in the boat compensates for most of the thermal losses by radiation or conduction to the ambient, and therefore, the power induced in the metal directly can almost fully be utilized for producing the molten zone. In optimum conditions, a thermal balance can be reached where the temperature of the boat and temperature of the molten metal are equal, and therefore, no heat transfer from the boat to the metal takes place. This condition can be observed experimentally and is characterized by a linear melting and solidification front on the surface of the melt.

The heat necessary for melting and for compensation of heat loss by radiation from the open surface of the melt, can be generated by a concentrated field, using, for example, the coil shown in FIGURES 1 and 2. There is no time delay between heat supply and heat conduction inside the metal. The wall of the boat being thin, thermal conduction along the boat is also minimized. Under this condition a narrow zone width is obtainable for any metal. The width of the molten zone is of a size comparable to the diameter of the ingot.

The stirring action due to induction currents insures uniform solute distribution in the liquid zone and the linear melting front obtainable reduces dendrite formation. These factors increase the efficiency of the refining or allow to a faster rate of refining.

The major part of heat losses being compensated by the power dissipated in the boat, the necessary power to be dissipated in the metal is considerably smaller than in the case of direct induction heating by known methods. The induced current does not cause a troublesome displacement of the liquid metal, and therefore, open boats can be used.

Using the apparatus according to invention, there is no difficulty in heating up the metal from room temperature to the melting point. The power dissipated in the boat is sufficient for this purpose.

Figure 4:
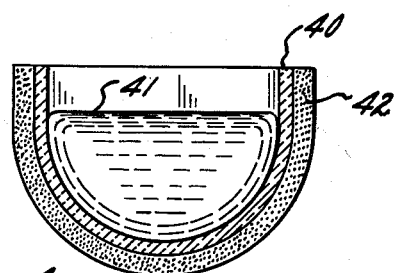
FIGURE 4 is a cross section of an alternative embodiment taken through the liquid metal zone with the induction current illustrated in dotted lines.

An alternative structure for the boat is illustrated in FIGURE 4 where the metal 41 is placed in a refractory oxide boat 40 and the boat then placed in a similarly shaped graphite sleeving 42 to fit close enough to insure a good contact between the refractory oxide boat and the sleeving. The same principles discussed above apply in this case too with some differences: In the first case the current induced in the boat flows along a circular path, the upper portion of the circle being closed through the molten metal. In the second case the boat is non-inductive and serves as an insulator between the molten metal and the graphite sleeving. Therefore, no circular flow is possible in the sleeving and its inductivity or power dissipation is lower than in the case of circular flow. FIGURES 3 and 4 show the path of inductive currents for the first and second case respectively. In the second case of insulated sleeving, the wall thickness of the sleeving can be up to 100 percent higher than the calculated skin depth to produce a useful partition between the power dissipated in the sleeving and the power dissipated in the metal. The conditions are otherwise practically identical, provided that a proper balance of power dissipation between sleeving and metal is reached and the temperature of the sleeving is close to the temperature of melt.

In both cases described above, according to invention, the optimum working conditions are determined by choice of the proper ratio of power dissipation between the boat, container or sleeving on one side, and the metal on the other side. This ratio depends on the electrical resistivity and thermal conductivity of the metal and of the boat or sleeving material, and on the geometry and heat insulation characteristics of the system. According to these conditions and other specific requirements, the optimum wall thickness for the boat or sleeving can be determined from the limits given by this invention, to be calculated from the skin depth at a given frequency for a given boat or sleeving material and metal. In the case of a boat made from a material coupling with high frequency field, the wall thickness is between 30 and 100 percent of the skin depth. In the case of an insulated sleeving the wall thickness is between 50 and 200 percent of the skin depth. The effective value to be chosen is dependent on the ratio of heat losses from the boat and from the metal. The best confirmation of optimum conditions according to invention is the measurement of the same temperature at the walls of the boat and on the surface of the melt by an optical pyrometer, or the observation of the linear melting front.

The foregoing discussion was limited to the case of metals with low electrical resistivity and high thermal conductivity. The use of boats or sleevings of limited wall thickness according to invention is also of advantage for any other application of zone melting, for purification, crystallization, alloying and other structural modifications. In the presence of a linear melting and solidification front on the surface, one may assume that both solid-liquid interfaces are planar. Under this condition the formation of dendrites is minimized and a large temperature gradient can be maintained in the liquid phase. This characteristic, in combination with the stirring action of the induced current, insure best efficiency for any zone melting process.

Two examples of the utilization of the aforementioned principles follow.

*Example 1.*—A copper rod of 8″ length and 5/16″ diameter is placed in a graphite boat of similar length and having a semicircular cross-section with ½″ I.D. and 3/64″ wall thickness. The boat is supported by two silica rods of ⅛″ diameter inside a silica tube of 1″ O.D. An inert gas atmosphere is kept inside the tube. The tube with the boat is moved at a speed of not more than 1/16″/min. and not less than 1/64″/min. through an induction coil of the type represented by FIGURE 1 and energized by an R.F. current of 450 kilocycles. The copper rod is melted down by fast passes to take the shape of the boat and then refined in subsequent slow passes. The width of the molten zone in the center of the boat is about ¾″ and shows a linear melting front perpendicular to the axis of the boat.

*Example 2.*—An aluminum ingot of ¾″ diameter is placed in a high purity aluminum oxide boat of 12″ length, 1″ width and ⅝″ height. The aluminum oxide boat is placed inside a graphite sleeving having a wall thickness of ⅛″ and made to fit exactly the outside dimensions of the aluminum oxide boat. The loaded boat and sleeve is supported by two silica rods inside a 2″ diameter Vycor tube. The melt-down of the ingot and refining are done as described in Example 1. The width of the molten zone in the center of the boat is about 1″ and shows a linear melting front, perpendicular to the axis of the boat. After six slow refining passes the total impurity content is reduced from 100 p.p.m., for 99.99 percent pure aluminum, to 2 to 5 p.p.m., according to the nature of the impurities in the metal and in the boat.

Although the invention has been described with reference to particular embodiments, it will be understood to those skilled in the art that the invention is capable of a variety of alternative embodiments within the spirit and scope of the appended claims.

We claim:

1. In combination, an induction heating coil capable of generating a concentrated field within said coil, and a container of a size to allow it to pass through said coil, said container comprising a pair of telescoped elongated arcuate walls in intimate contact with each other, and plates at the ends of said inner wall and said outer wall of said telescoped walls, said inner wall and end plates being of a material not amenable to induction heating and said outer wall and end plates being of a material amenable to induction heating, the thickness of said outer wall being less than twice the skin depth of the current induced in the outer wall of said telescoped walls.

2. In combination, an induction heating coil capable of generating a concentrated field within said coil, and a container of a size to allow it to pass through said coil, said container comprising a pair of telescoped elongated arcuate walls in intimate contact with each other, and plates at the ends of said telescoped walls, said inner wall and end plates being of a material not amenable to induction heating and said outer wall and end plates being of a material amenable to induction heating, the thickness of said outer wall being equal to twice the skin depth of the current induced in the outer wall of said telescoped walls.

References Cited in the file of this patent

UNITED STATES PATENTS

| 1,975,438 | Sorrel | Oct. 2, 1934 |
| 2,181,274 | Jackson et al. | Nov. 28, 1939 |
| 2,576,862 | Smith et al. | Nov. 27, 1951 |
| 2,773,923 | Smith | Dec. 11, 1956 |
| 2,826,666 | Cater | Mar. 11, 1958 |
| 2,912,553 | Tudbury | Nov. 10, 1959 |

FOREIGN PATENTS

| 969,277 | Germany | May 14, 1958 |